United States Patent
Baek

(10) Patent No.: US 7,630,044 B2
(45) Date of Patent: Dec. 8, 2009

(54) IN-PLANE SWITCHING MODE LCD DEVICE HAVING THE INTERVAL BETWEEN THE COMMON AND PIXEL ELECTRODES IN THE REFLECTIVE PART BEING GREATER THAN THE INTERVAL BETWEEN THE COMMON AND PIXEL ELECTRODES IN TRANSMITTING PART

(75) Inventor: Heume Il Baek, Anyang-shi (KR)

(73) Assignee: LG Display Co., Ltd., Seoul (KR)

( * ) Notice: Subject to any disclaimer, the term of this patent is extended or adjusted under 35 U.S.C. 154(b) by 555 days.

(21) Appl. No.: 11/234,081

(22) Filed: Sep. 26, 2005

(65) Prior Publication Data

US 2006/0050218 A1     Mar. 9, 2006

(51) Int. Cl.
*G02F 1/1343* (2006.01)
(52) U.S. Cl. .................. 349/141; 349/114; 349/117
(58) Field of Classification Search .............. 349/114, 349/141, 117–121
See application file for complete search history.

(56) References Cited

U.S. PATENT DOCUMENTS

| 6,608,660 | B1 * | 8/2003 | Okamoto et al. | 349/113 |
| 7,088,409 | B2 * | 8/2006 | Itou et al. | 349/114 |
| 2001/0048496 | A1 * | 12/2001 | Baek | 349/114 |
| 2001/0052948 | A1 * | 12/2001 | Okamoto et al. | 349/12 |
| 2005/0140867 | A1 * | 6/2005 | Choi | 349/114 |

* cited by examiner

*Primary Examiner*—John Heyman
(74) *Attorney, Agent, or Firm*—McKenna Long & Aldridge LLP

(57) ABSTRACT

An IPS mode LCD device is disclosed in which a retardation layer is formed in a reflective part of unit pixel region to efficiently operate both transmitting and reflective modes and to improve the contrast ratio, the unit pixel region having a transmitting part and a reflective part, wherein a cell gap in the transmitting part is substantially the same as a cell gap in the reflecting part.

13 Claims, 9 Drawing Sheets

FIG. 4
Related Art

| reflective part | | upper POL | HWP | liquid crystal | reflective plate | liquid crystal | HWP | upper POL |
|---|---|---|---|---|---|---|---|---|
| OFF | | ↔ | ↘ | ◯ | ◯ | ↗ | ↕ | |
| ON | | ↔ | ↔ | ↘ | ↘ | ↘ | ↔ | ↔ |

| transmitting part | | lower POL | liquid crystal | HWP | upper POL |
|---|---|---|---|---|---|
| OFF | | ↔ | ↘ | ↕ | |
| ON | | ↔ | ↘ | ↔ | ↔ |

|  |  | lower POL | liquid crystral | upper POL |
|---|---|---|---|---|
| transmiting part | OFF | ↔ | ↔ |  |
|  | ON | ↔ | ↕ | ↕ |

IN-PLANE SWITCHING MODE LCD DEVICE HAVING THE INTERVAL BETWEEN THE COMMON AND PIXEL ELECTRODES IN THE REFLECTIVE PART BEING GREATER THAN THE INTERVAL BETWEEN THE COMMON AND PIXEL ELECTRODES IN TRANSMITTING PART

This application hereby incorporates by reference Korean Patent Application No.P2005-72118 filed on Sep. 9, 2004, for all purposes as if fully set forth herein.

BACKGROUND OF THE INVENTION

1. Field of the Invention

The present invention relates to a liquid crystal display (LCD) device, and more particularly, to an In-Plane Switching (IPS) mode LCD device to improve the contrast ratio and to efficiently operate both reflective and transmitting modes.

2. Discussion of the Related Art

Recently, a liquid crystal display (LCD) device, which is a flat display, has been actively studied and researched because of its advantageous characteristics. The LCD device uses an optical anisotropy characteristic of liquid crystal to adjust light transmittance and display images. The optical anisotropy of the liquid crystal may be changed by applying an electric field to liquid crystal, which has both the fluidity of liquid and optical characteristics. The LCD device has attracted great interest as a new display device that can substitute for convention cathode ray tube (CRT) displays in that the LCD device has a thin profile, light weight, and low power consumption.

In general the LCD device includes a color filter (C/F) array substrate and a thin film transistor (TFT) array substrate, wherein the TFT and C/F substrates are positioned opposite to each other. Also, a liquid crystal layer having dielectric anisotropy is formed between the lower and upper substrates. The LCD device includes a plurality of pixels, each pixel having a thin film transistor TFT. A voltage is applied to the corresponding pixel through a pixel-selection address line by switching the thin film transistor of the pixel region.

The LCD device has various modes according to the properties of liquid crystal and pattern structures. Some of the various modes include a Twisted Nematic (TN) mode in which liquid crystal directors are controlled by applying a voltage after arrangement of liquid crystal directors twisted at 90°; a multi-domain mode in which a wide viewing angle may be obtained by dividing one pixel into several domains; an Optically Compensated Birefringence (OCB) mode in which a phase change of light is compensated according to the direction of light by forming a compensation film on an outer surface of a substrate; and an In-Plane Switching (IPS) mode in which a transverse electric field is created substantially parallel to the substrates by forming two electrodes on any one substrate.

In the meantime, LCD devices may also be classified as a transmitting type LCD, which uses a backlight as a light source; a reflective type LCD device, which was the ambient light as a light source; and a trans-reflective type LCD device, which uses both a backlight and the ambient light. In case of the trans-reflective type LCD device, it is possible to reduce the disadvantages of the transmitting type LCD device and the reflective type LCD device. That is, the transmitting type LCD device has the problem of high power consumption due to the use of backlight. Also, the reflective type LCD device can not be used in the dark surroundings.

The trans-reflective type LCD device includes unit pixel regions, wherein each of the unit pixels has a transmitting part and a reflective part. Thus, the trans-reflective type LCD device can use both the ambient light and the light generated from the backlight.

In the transmitting part of the transmitting type and trans-reflective type LCD devices, the light that is emitted from the backlight and is incident through the lower substrate reaches the liquid crystal layer, thereby improving the luminance. Also, in case of the reflective part of the reflective type and trans-reflective type LCD devices, in bright surroundings, the ambient light that is incident through the upper substrate is reflected so as to improve the luminance.

To realize the maximum efficiency in the transmitting and reflective parts, a dual-cell gap method has been proposed, in which a cell gap of the transmitting part is about twice as large as a cell gap of the reflective part.

The trans-reflective type may be applicable to the IPS mode LCD device. In this case, it is possible to maximize the efficiency in trans-reflective mode by forming an electrode of a dual-cell gap method.

Hereinafter, an IPS mode LCD device of a trans-reflective type will be described with reference to the accompanying drawings.

FIG. 1 is a plane view of an IPS mode LCD device according to the related art. FIG. 2 is a cross sectional view along I-I' of FIG. 1. FIG. 3 is an optical schematic view according to the related art. FIG. 4 is a comparative table of showing the change of polarizing state in reflective and transmitting parts according to the related art.

Referring to in FIG. 1 and FIG. 2, an IPS mode LCD device according to the related art includes a plurality of pixel regions. Each pixel region includes of a reflective part R and a transmitting part T. The IPS mode LCD device includes a thin film transistor array substrate 11 including a plurality of lines and thin film transistors, a color filter array substrate 21 formed in opposite to the thin film transistor array substrate 11, and a liquid crystal layer 31 formed between the thin film transistor array substrate 11 and the color filter array substrate 21. In this state, the liquid crystal layer in the transmitting part (d1) is twice as large as a gap of liquid crystal in the reflective part (d2), which is referred to as a dual-cell gap structure.

As illustrated in FIGS. 1 and 2, the thin film transistor array substrate 11 includes a gate line 12, a data line 15, a thin film transistor TFT, a reflective plate 60, a passivation layer 16, a common electrode 24, and a pixel electrode 17. At this time, the gate line 12 is perpendicular to the data line 15, to define a unit pixel region. The thin film transistor TFT is formed near a crossing of the gate line 12 and the data line 15. The thin film transistor TFT includes a gate electrode 12a, a gate insulating layer 13, a semiconductor layer 14, and source and drain electrodes 15a and 15b. A reflective plate 60 is formed in the reflective part R, so as to reflect the ambient light. A passivation layer 16 corresponds with the data line 15 and the reflective part 60. Also, the common electrode 24 and the pixel electrode 17 are formed on a portion of the passivation layer 16, wherein the common electrode 24 and the pixel electrode 17 generate a transverse electric field.

The reflective part R of the IPS mode LCD of FIG. 1 includes a gate insulating layer 13 and the passivation layer 16. However, the gate insulating layer 13 and the passivation layer 16 are removed for the transmitting part, thereby forming a dual-cell gap. That is, the cell gap of liquid crystal in the transmitting part (d1) is twice as large as the cell gap (d2) of liquid crystal in the reflective part.

By removing the gate insulating layer 13 and the passivation layer 16 from the transmitting part, it is possible to maximize the efficiency of transmitting mode by appropriately applying turning-on and off modes in the transmitting and reflective parts. The cell gap 'd1' of the transmitting part T is twice as large as the cell gap 'd2' of the reflective part R.

Accordingly, the ambient light incident on the reflective part and the light incident on the transmitting part simultaneously reach the surface of screen for displaying images. That is, the ambient light incident on the reflective part reaches the surface of screen after passing through the liquid crystal layer twice. In the meantime, the light, emitted from the backlight and is incident on the transmitting part, reaches the surface of screen after passing through the liquid crystal layer of the transmitting part which has the cell gap twice as large as the reflective part. As a result, the light incident on the reflective part and the light incident on the transmitting part simultaneously reach the surface of screen for displaying images.

The reflective plate 60 is formed of aluminum Al, aluminum neodymium AlNd, or argentums Ag. The reflective plate 60 reflects the ambient light in bright surroundings, thereby displaying the image on the screen.

The transmitting part T includes a first portion from which the passivation layer 16 is removed, and a second portion in which the passivation layer 16 is formed. In the transmitting part T including the first and second portions, there are the first common electrode 24a and the pixel electrode 17, thereby forming a first transverse electric field E1. The pixel electrode 17 is also formed in the reflective part, whereby the pixel electrode 17 and the second common electrode 24b, provided on the passivation layer 16, generate a second transverse electric field E2.

In the IPS mode LCD device having the dual-cell gap by dividing the pixel region into the reflective and transmitting parts, the common and pixel electrodes are respectively formed in parallel to the transmitting and reflective parts. In the transmitting part, the first transverse electric field E1 is formed in the entire cell gap 'd1' of the transmitting part by the first common electrode 24a and the pixel electrode 17. In the reflective part, the second transverse electric field E2 is formed in the entire cell gap 'd2' of the reflective part by the second common electrode 24b and the pixel electrode 17. Accordingly, when the ambient light is not enough to drive the IPS mode LCD device, the IPS mode LCD device operates in the transmitting mode by the first transverse electric field E1. When the ambient light is enough to drive the IPS mode LCD device, the IPS mode LCD device operates in the reflective mode by the second transverse electric field E2.

The widths of the transmitting and reflective parts may be varied according to the size and number of pixel regions. Preferably, the ratio of width in the transmitting part to the reflective part is about 1 to 1 or 3 to 1.

The color filter array substrate 21 includes a black matrix layer 22, and a color filter layer 81. At this time, the black matrix layer 22 having a plurality of black matrix patterns is provided to prevent the light leakage. The color filter layer 81 includes a plurality of color filter patterns, wherein each of the color filter patterns is provided between each of the black matrix patterns.

In addition, first and second alignment layers (not shown) are formed on inner surfaces of the thin film transistor array substrate 11 and the color filter array substrate 21, so as to align liquid crystal molecules of the liquid crystal layer 31 in a predetermined direction. Also, first and second polarizing sheets 50 and 51 are formed on outer surfaces of the thin film transistor array substrate 11 and the color filter array substrate 21. A phase-difference plate is additionally formed between the color filter array substrate 21 and the second polarizing sheet, wherein the phase-difference sheet im parts phase delay.

The first and second polarizing sheets 50 and 51 transmit only the light parallel to the light-transmission axis, whereby the ambient light is changed to the linearly polarized light. The phase-difference plate changes the polarizing state of light, which is formed of a half wave plate HWP having a phase difference of $\lambda/2$ to change the linearly polarized light by the phase delay of 180°.

The transmission axes of the first and second polarizing sheets, the transmission axis of phase-difference plate, and the director of liquid crystal molecule may be configured so that the exemplary IPS LCD is in a normally black mode.

As illustrated in FIG. 3, the transmission axis of the phase-difference plate HWP is positioned at an angle of +Θ in relation to the transmission axis of the upper polarizing sheet 51 (upper POL). Also, the transmission axis of the lower polarizing sheet 50 (lower POL) is positioned at an angle of +Θ in relation to the optical axis of the phase-difference plate HWP. Then, the liquid crystal molecules are initially aligned at an angle of +45° in relation to the transmission axis of the lower polarizing sheet (lower POL). When the liquid crystal molecules are driven by an electric field, the liquid crystal molecules are rotated at an angle of −45° in relation to the transmission axis of the lower polarizing sheet, thereby realizing the white level.

The light path of a trans-reflective IPS LCD device with the optical structure of FIG. 3, will be described with reference to FIG. 4. In FIG. 4, arrows represent the direction of light passing through the respective parts.

In an OFF state in the reflective part, (i.e., when the liquid crystal is not driven), the ambient light incident on the upper polarizing sheet 51 (upper POL) is rotated at an angle of 2 Θ by the phase-difference plate HWP, and then the light passes through the liquid crystal, whereby the light is changed to the circularly polarized light. Thus, the circularly polarized light reaches the reflective plate. Then, the circularly polarized light is reflected on the reflective plate, and then the reflected light passes through the liquid crystal layer, whereby the light is changed to the linearly polarized light. Then, the linearly polarized light is rotated at an angle of 2 Θ by the phase-difference plate, whereby the light is emitted at an angle of 90° in relation to the transmission axis of the upper polarizing sheet 51. However, the light does not pass through the transmission axis of the upper polarizing sheet, thereby realizing the black level.

At this time, the cell gap of liquid crystal in the reflective part corresponds to 'd/2' ($=\Delta$ nd) corresponding to $\lambda/4$ (Quarter Wave Plate; QWP), whereby the linearly polarized light is changed to the circularly polarized light, and the circularly polarized light is changed to the linearly polarized light.

In an ON state in the reflective part, (i.e., when the liquid crystal is driven), the ambient light incident on the upper polarizing sheet 51 (upper POL) is rotated at an angle of 2 Θ by the phase-difference plate HWP, and then the light passes through the liquid crystal layer. After that, the light reaches the reflective plate. Then, the light is reflected on the reflective plate, and the reflected light passes through the liquid crystal layer. Therefore, the light is rotated at an angle of 2 Θ by the phase-difference plate HWP, whereby the light is emitted in the same direction as the transmission axis of the upper polarizing sheet 51. As the light passes through the upper polarizing sheet, it is realized as the white level. At this time, in case of driving the liquid crystal, the liquid crystal is rotated at an angle of −45°, whereby the liquid crystal is aligned in the same direction as the transmission axis of the lower polarizing sheet.

In case of the transmitting part, when the liquid crystal is not driven (off state), the polarizing direction of light emitted from the backlight and incident on the lower polarizing sheet 50 (lower POL) is changed to 90° by the liquid crystal molecules initially aligned. Then, the polarizing direction of light is changed at an angle of 2 Θ by the phase-difference plate HWP, whereby the light is emitted at an angle of 90° in relation to the transmission axis of the upper polarizing sheet 51. Accordingly, the light does not pass through the upper polarizing sheet, thereby realizing the black level.

At this time, the gap of liquid crystal in the transmitting part corresponds to 'd' (=2 Δ nd) corresponding to λ/2 (Half Wave Plate; HWP), to change the polarizing direction of light. That is, the polarizing direction of light is changed symmetric to the alignment direction of liquid crystal.

In the transmitting part, when the liquid crystal is driven (on state), the light, which is emitted from the backlight and is incident on the lower polarizing sheet 50 (lower POL), passes through the liquid crystal, and then the polarizing direction of light is changed by the phase-difference plate HWP, whereby the light is emitted in the same direction as the transmission axis of the upper polarizing sheet 51, thereby realizing the white level. At this time, in case of driving the liquid crystal, the liquid crystal molecules are rotated at an angle of −45°, whereby the liquid crystal molecules are aligned in the same direction as the transmission axis of the lower polarizing sheet.

Unlike the transmitting part of the transmitting type IPS mode LCD device, the transmitting part of the trans-reflective type IPS mode LCD device may have the circularly polarized light due to birefringence of the phase-difference plate HWP, thereby generating the luminance in the black level. Thus, it is impossible to realize a strong black level state in the IPS mode LCD device.

SUMMARY OF THE INVENTION

Accordingly, the present invention is directed to an LPS mode LCD device that substantially obviates one or more problems due to limitations and disadvantages of the related art.

An advantage of the present invention is to provide an IPS mode LCD device in which a retardation layer is formed in a reflective part of an LCD panel so as to prevent birefringence of phase-difference plate HWP in a transmitting part, thereby substantially removing a black level luminance in a transmitting mode.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, an IPS mode LCD device includes gate and data lines, being in perpendicular to each other on a first substrate, for defining a unit pixel region divided into a transmitting part and a reflective part; a thin film transistor at an intersection of the gate and data lines; a reflective plate in the reflective part; a passivation layer on an entire surface of the first substrate including the reflective plate; a common line in parallel to the gate line; a common electrode diverged from the common line; a pixel electrode, formed in parallel to the common electrode, for generating a transverse electric field; a retardation layer in the reflective part on the pixel electrode; a second substrate in opposite to the first substrate; a liquid crystal layer between the first and second substrates; and first and second polarizing sheets respectively formed on outer surfaces of the first and second substrates.

In the IPS mode LCD device according to the present invention, the retardation layer is formed in the reflective part of an LCD panel, whereby it is possible to efficiently operate a transmitting mode.

Accordingly, it is possible to prevent birefringence in the transmitting part, thereby improving the contrast ratio by completely removing a luminance from a black level.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 is a comparative table of showing the polarizing state in reflective and transmitting parts according to the related art;

DETAILED DESCRIPTION OF THE ILLUSTRATED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Hereinafter, an IPS mode LCD device according to the present invention will be described with reference to the accompanying drawings.

Figure 1:
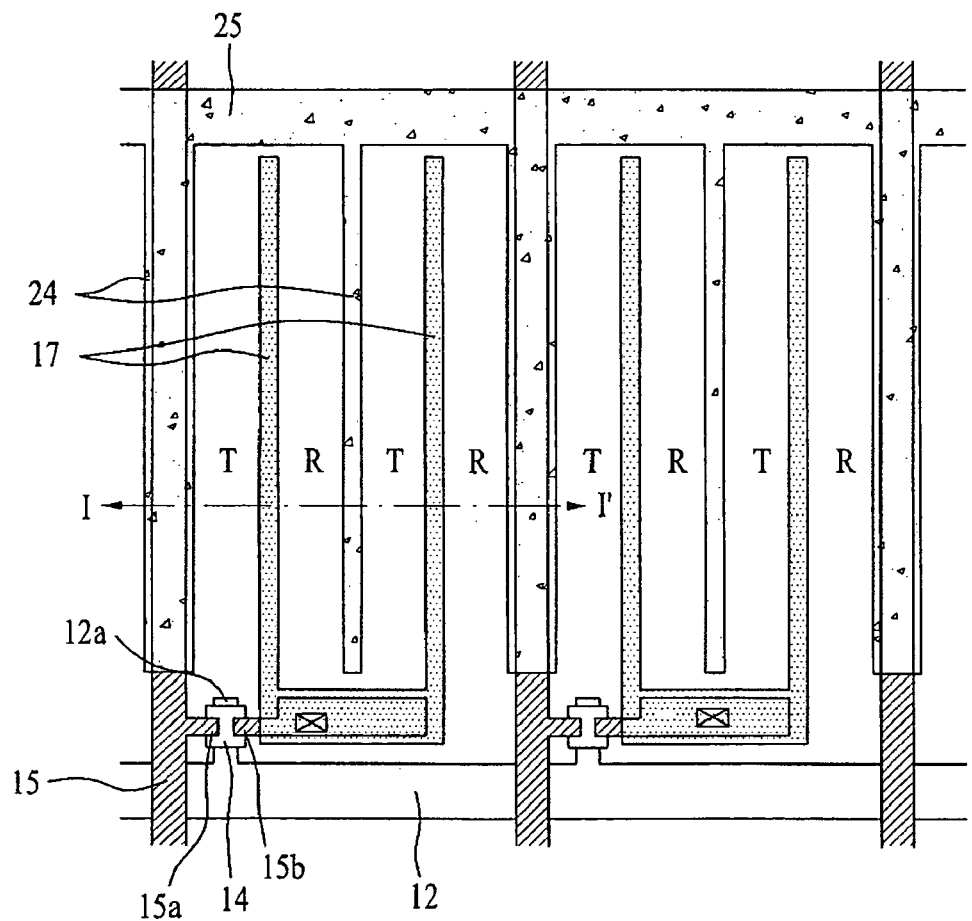
FIG. 1 is a plane view of an IPS mode LCD device according to the related art.
Figure 2:
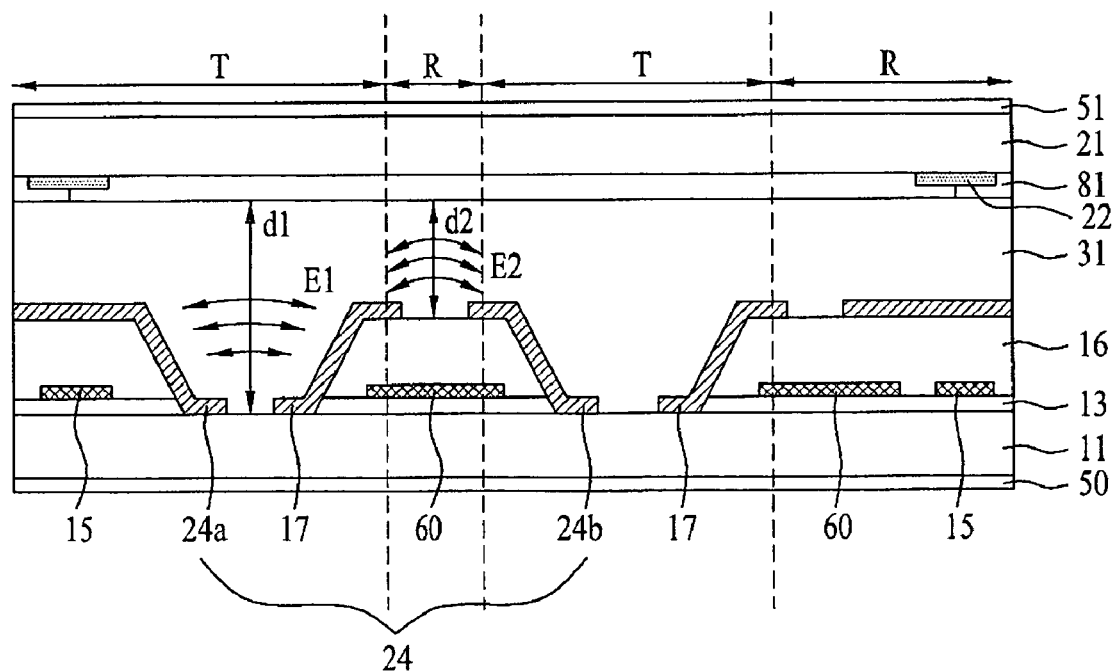
FIG. 2 is a cross sectional view along I-I' of FIG. 1.
Figure 3:
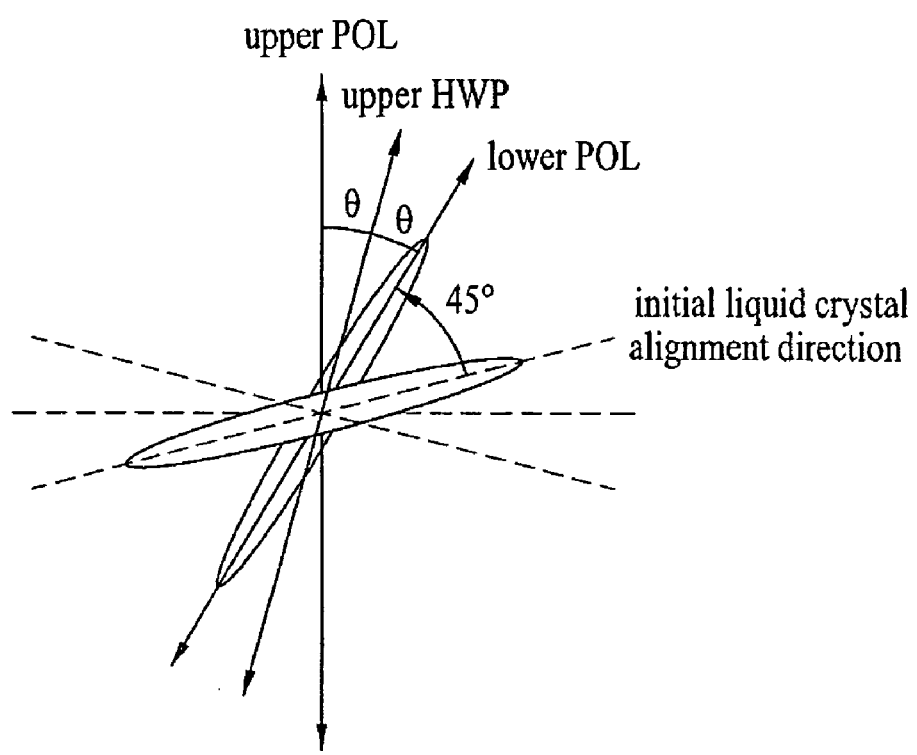
FIG. 3 is an optical schematic view according to the related art.
Figure 5:
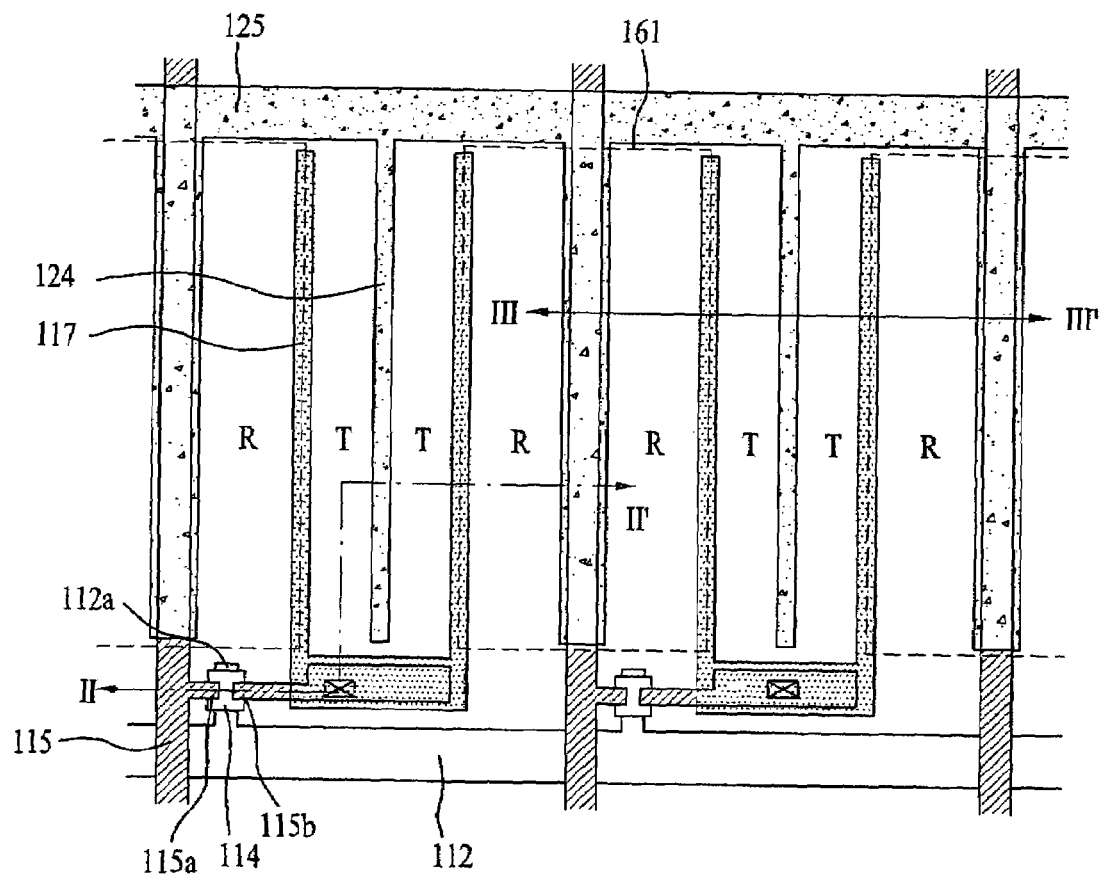
FIG. 5 is a plane view of an IPS mode LCD device according to the present invention.
Figure 6:
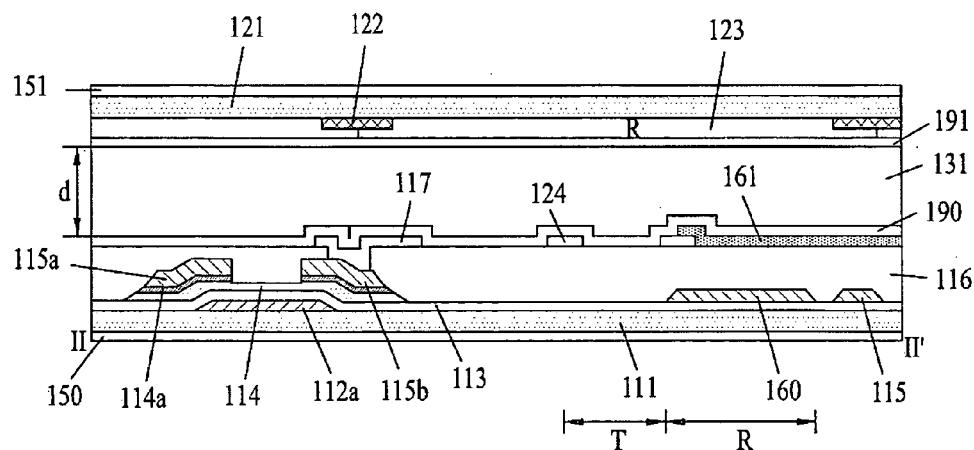
FIG. 6 is a cross sectional view along II-II' of FIG. 5.
Figure 7:
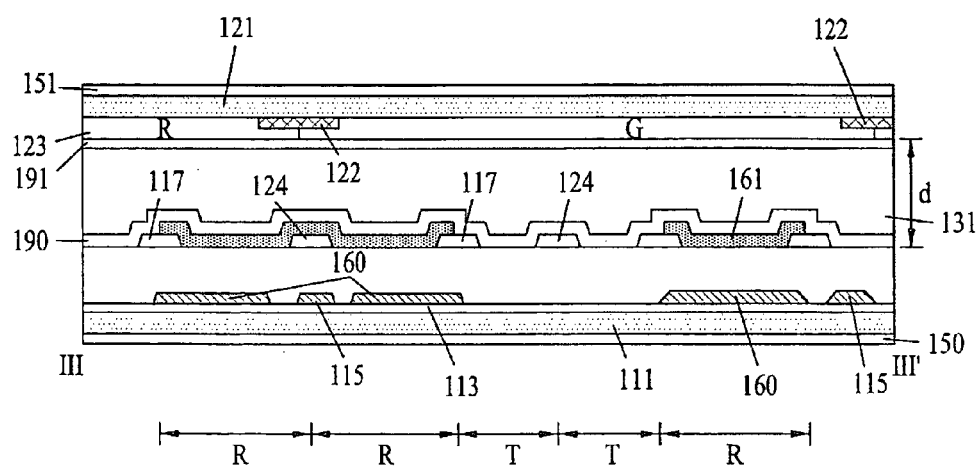
FIG. 7 is a cross sectional view along III-III' of FIG. 5.

FIG. 5 is a plane view of an IPS mode LCD device according to the present invention. FIG. 6 is a cross sectional view along II-II' of FIG. 5. FIG. 7 is a cross sectional view along III-III' of FIG. 5.

Figure 8:
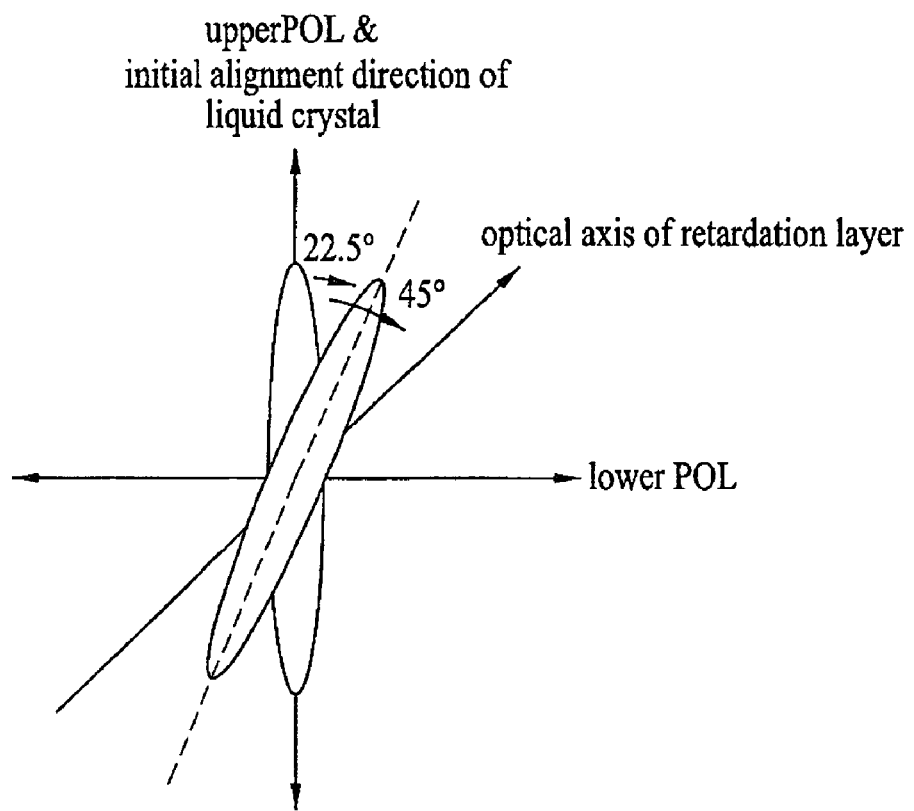
FIG. 8 is an optical schematic view of a reflective part according to the present invention.
Figure 9:
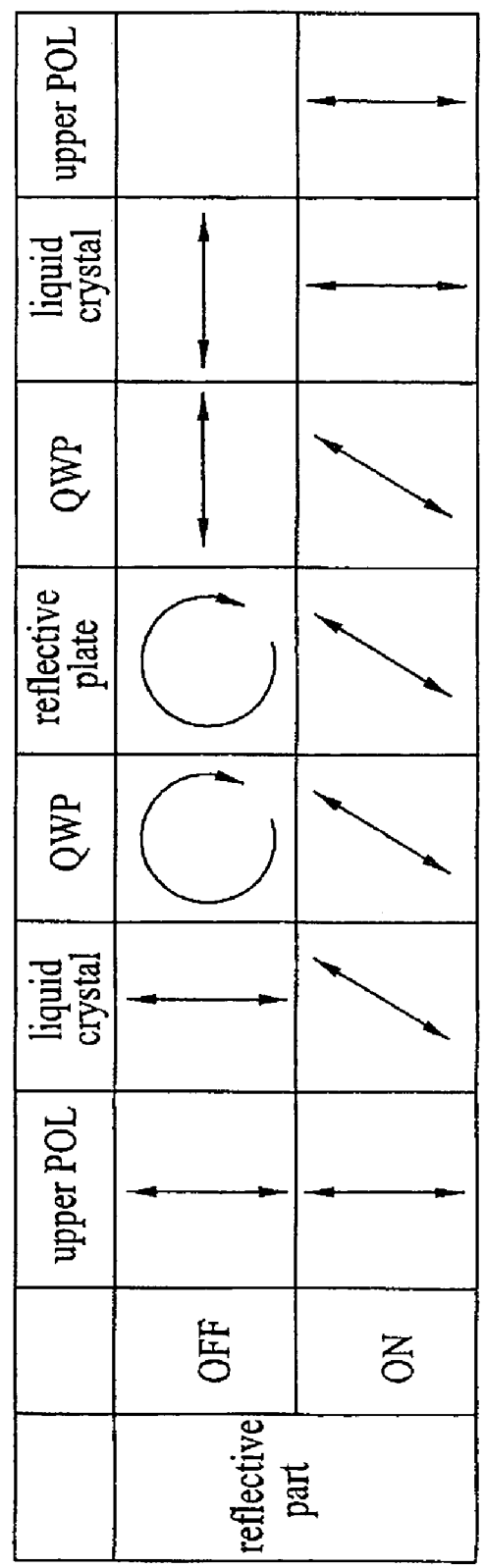
FIG. 9 shows the change of polarizing state in a transmitting part according to the present invention.
Figures 10, 11:
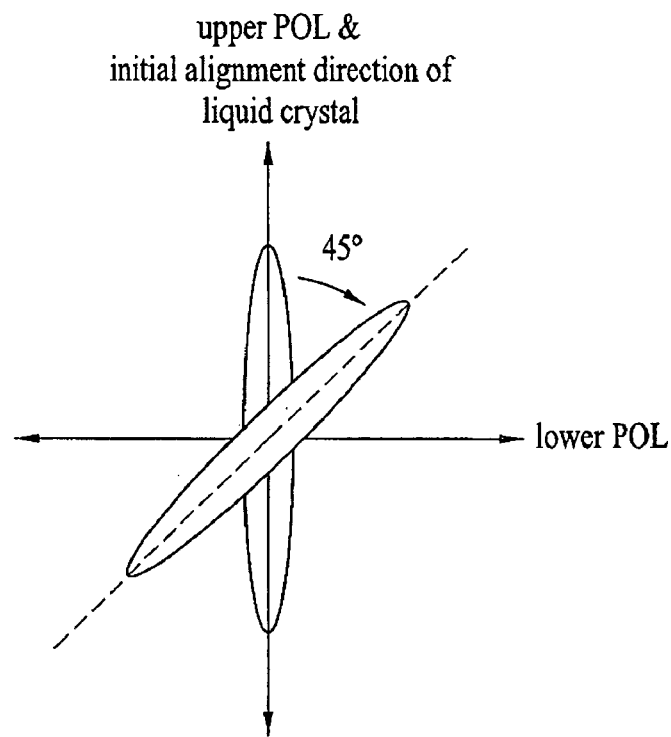
FIG. 10 is an optical schematic view of a transmitting part according to the present invention.
FIG. 11 shows the change of polarizing state in a reflective part according to the present invention.

FIG. 8 is an optical schematic view of a reflective part according to the present invention. FIG. 9 shows the change of polarizing state in a transmitting part according to the present invention. FIG. 10 is an optical schematic view of a transmitting part according to the present invention. FIG. 11 shows the change of polarizing state in a reflective part according to the present invention.

As illustrated in FIGS. 5 to 7, an IPS mode LCD device according to the present invention includes a thin film transistor array substrate 111, a color filter array substrate 121, a liquid crystal layer 131, a retardation layer 161, first and second alignment layers 190 and 191, and first and second polarizing sheets 150 and 151.

The thin film transistor array substrate 111 includes a plurality of gate and data lines 112 and 115, a plurality of thin film transistors TFTs, a common electrode 124, and a pixel electrode 117. In this case when a voltage is applied, the common electrode 124 and the pixel electrode 117 generate a transverse electric field. Also, the thin film transistor array substrate 111 includes a plurality of pixel regions, each pixel region divided into a reflective part R and a transmitting part T.

The color filter array substrate 121 is positioned opposite the thin film transistor array substrate 111. The liquid crystal layer 131 is between the thin film transistor array substrate 111 and the color filter array substrate 121. Also, the retardation layer 161 corresponds with the reflective part of the thin film transistor array substrate 111. Then, the first and second alignment layers 190 and 191 may be formed on inner surfaces of the thin film transistor array substrate 111 and the color filter array substrate 121 so as to provide the initial alignment direction of liquid crystal molecules of the liquid crystal layer 131. The first and second polarizing sheets 150 and 151 are formed on outer surfaces of the thin film transistor array substrate 111 and the color filter array substrate 121.

The IPS mode LCD device is operated in a trans-reflective mode. That is, the transmitting part of the IPS mode LCD device operates in a transmitting mode with the light emitted from a backlight. Also, the reflective part of the IPS mode LCD device operates in a reflective mode with the ambient light. In case of the reflective mode, the ambient light is phase-delayed by the retardation layer 161.

In more detail, on the thin film transistor array 111, there are a gate line 112 and a data line 115 substantially perpendicular to each other to define a unit pixel region. Also, the gate line 112 and the data line 115 are insulated from each other by a gate insulating layer 113. The thin film transistor TFT is formed near a crossing of the gate and data lines 112 and 115. The thin film transistor TFT acts as a switch to control the turning-on or turning-off state of the unit pixel according to an addressing signal. A reflective plate 160 is formed in the reflective part R, so as to reflect the incident light to the side of the color filter array substrate. Also, a passivation layer 116 is formed on an entire surface of the thin film transistor array substrate 111 including the thin film transistor. Then, a common line 125 is formed on the passivation layer 116 in parallel to the gate line 112. Common electrodes 124 extend from the common line 125. The pixel electrode 117 is connected with a drain electrode 115b of the thin film transistor, wherein the pixel electrode 117 is substantially parallel to the common electrode 124. Also, the retardation layer 161, formed in the reflective part R, delays the phase of ambient light. In addition, the first alignment layer 190 may be formed on the entire surface of the thin film transistor array substrate 111 including the retardation layer 161, wherein the first alignment layer 190 provides the initial alignment direction of liquid crystal.

As explained above, the pixel region of the LCD device is divided into the reflective part R and the transmitting part T. In this case, a block, which is defined with the common electrode adjacent to the pixel electrode inside the pixel region, may be formed as the reflective part or the transmitting part. In the pixel region, the reflective and transmitting parts may be selectively positioned. In the exemplary embodiment of FIG. 5, the reflective and transmitting parts are positioned in order of R, T, T and R, however, other patterns of reflective and transmitting parts may be used.

The number of blocks inside the pixel region is not limited. That is, the number of blocks may be changed according to the size of LCD device, the number of pixel regions, and the pitch between the pixel regions. In FIG. 5, four blocks are formed in the pixel region. Even though the two LCD devices have the same size, if one has the large pitch in pixel region, it has a relatively large pixel region. Thus, in case of the LCD device having large pitch, six blocks may be formed in the pixel region. In the LCD device having small pitch, two blocks may be formed in the pixel region.

In the example of FIG. 5, the reflecting plate 160 is formed in the same layer as the data line 115 at the same time. The common line 125 and the common electrode 124 may be formed on the passivation layer 116 in the same layer as the pixel electrode 117 or the gate line 112 at the same time.

The retardation layer 161 may be formed of a liquid crystal material including RM (Reactive Mesogen) in a deposition method or a coating method. In order to determine the optical axis, molecules of the retardation layer 161 are substantially arranged in a predetermined direction. Although not shown, a third alignment layer may be additionally formed under the retardation layer 161, so as to provide an alignment direction to the retardation layer.

That is, the third alignment layer is coated to correspond with the reflective part of the passivation layer 116 having the pixel electrode, and then the alignment direction of the third alignment layer is determined by rubbing. The liquid crystal including Mesogen is coated on the third alignment layer, and is initially aligned and cured, thereby forming the retardation layer 161.

In the meantime, the thin film transistor TFT includes a gate electrode 112a, the gate insulating layer 113, a semiconductor layer 114, an ohmic contact layer 114a, and source and drain electrodes 115a and 115b. The gate electrode 112a may extend from the gate line 112, and the gate insulating layer 113 is formed on the gate electrode 112a. The semiconductor layer 114 may be formed by depositing amorphous silicon a-Si:H above the gate electrode 112a and may be isolated (island-shaped). Also, the ohmic contact layer 114a is formed of n⁺a-Si which is made by implanting impurity ions to the amorphous silicon. The ohmic contact layer 114 is provided to improve the contact characteristics between the semiconductor layer 114 and the upper layers. The source and drain electrodes 115a and 115b are formed on the semiconductor layer 114. The source electrode 115a extends from the data line, and the drain electrode 115b contacts a portion of the pixel electrode 117.

The gate and data line layers may be formed by depositing and patterning low-resistance metal such as copper Cu, aluminum Al, aluminum neodymium AlNd, tin Sn, molybdenum Mo, chrome Cr, titanium Ti, tantalum Ta, or molybdenum-tungsten MoW or the like by sputtering. Then, the reflecting plate 160 is formed of low-resistance metal having great reflectivity.

The gate insulating layer 113 may be formed of an inorganic insulating material of silicon oxide $SiO_x$ or silicon nitride $SiN_x$ by PECVD (Plasma Enhanced Chemical Vapor Deposition). The passivation layer 116 may be formed by depositing an inorganic insulating material such as silicon oxide $SiO_x$ or silicon nitride $SiN_x$ or by coating an organic insulating material such as BCB (Benzocyclobutene) or acrylic-based material.

The IPS mode LCD device may be fabricated in a normally black mode by controlling the transmission axes of the first and second polarizing sheets 150 and 151, the optical axis of the retardation layer 161, and the angle in directors of liquid crystal molecules. That is, the liquid crystal layer 131 may have a phase-difference value of $\lambda/2$ by controlling a cell gap of liquid crystal, and the retardation layer 161 has the phase-difference value corresponding to $\lambda/4$ of QWP (Quarter Wave Plate).

That is, the transmission axis of the upper polarizing sheet 151 is substantially perpendicular to the transmission axis of the lower polarizing sheet 150. Also, the liquid crystal may be initially aligned in the same direction as the transmission axis of the upper polarizing sheet 151. The transmission axis of the retardation layer 161 in the reflective part R is formed at an angle of +45° in relation to the transmission axis of the upper polarizing sheet 151.

In case of driving the liquid crystal, the liquid crystal molecules of the reflective part R are on average rotated at an angle of +22.5° in relation to the polarizing axis of the upper polarizing sheet 151. Also, the liquid crystal molecules of the transmitting part T are on average rotated at an angle of +45°.

To control the rotation angle of the liquid crystal molecules, it is necessary to determine the width of the pixel and common electrodes in the reflective and transmitting parts R and T. That is, the rotation power of the liquid crystal molecules changes according to the intensity of electric field applied to the pixel and common electrodes 117 and 124. In case of the reflective part, an interval between the common and pixel electrodes may be greater because the liquid crystal molecules are rotated at an angle of +22.5°. In the meantime, in case of the transmitting part, the interval between the common and pixel electrodes may be less because the liquid crystal molecules are rotated at an angle of +45°.

In the IPS mode LCD device according to the present invention, the interval between the common and pixel electrodes in the reflective part is greater than the interval between the common and pixel electrodes in the transmitting part.

When there is a predetermined electrode width in the reflective and transmitting parts, the rotation angle of liquid crystal molecules may be controlled by the driving voltage applied to the reflective and transmitting parts. That is, if using the same driving voltage in the reflective and transmitting parts R and T, the intensity of electric field in the reflective part R is greater than the intensity of electric field in the transmitting part T. In another method, by differently applying the voltage applied to the common electrodes in the reflective and transmitting parts, it is possible to control the rotation angle of liquid crystal molecules.

Hereinafter, the optical structure and polarizing state in the reflective and transmitting parts R and T will be described in detail.

In case of the optical structure of the reflective part, as illustrated in FIG. 8, the transmission axis of the upper polarizing sheet 151 (upper POL) is substantially perpendicular to the transmission axis of the lower polarizing sheet 150 (lower POL), and the initial alignment of liquid crystal may be aligned in the same direction as the transmission axis of the upper polarizing sheet. In that case, the optical axis of the retardation layer 161 is formed at an angle of +45° in relation to the transmission axis of the upper polarizing sheet 151 (upper POL). On applying the voltage, the liquid crystal molecules of the reflective part R rotate at an angle of +22.5° in relation to the polarizing axis of the upper polarizing sheet 151 (upper POL).

The path of ambient light, applied to the reflective part, will be described with reference to FIG. 9. If the liquid crystal is not driven (off-state), the ambient light which is incident on the upper polarizing sheet 151 (upper POL) passes through the initially aligned liquid crystal 131 and the retardation layer 161 QWP. Thus, the light is changed to the circularly polarized light, and the circularly polarized light reaches the reflecting plate 160. Then, as the circularly polarized light, which is reflected from the reflecting plate 160, passes through the retardation layer 161 QWP, the circularly polarized light is changed to the linearly polarized light. The linearly polarized light passes through the liquid crystal layer 131, whereby the light is emitted at an angle of 90° in relation to the transmission axis of the upper polarizing sheet 151 (upper POL). However, since the light does not pass through the upper polarizing sheet 151, it is displayed as a black level.

As explained above, the retardation layer 161 is formed of the material having the phase-difference of $\lambda/4$, which functions as the QWP (Quarter Wave Plate). That is, the retardation layer 161 changes the circularly polarized light to the linearly polarized light, and changes the linearly polarized light to the circularly polarized light.

In the reflecting part R, when the liquid crystal is driven (on-state), the liquid crystal molecules are rotated at an angle of 22.5° in relation to the polarizing axis of the upper polarizing sheet 151 (upper POL). By the HWP (Half Wave Plate) with the phase delay of $\lambda/2$, the incident light passing through the polarizing axis of the upper polarizing sheet 151 is symmetrically rotated at an angle of 45°.

Accordingly, as the ambient light incident on the upper polarizing sheet 151 (upper POL) passes through the liquid crystal layer 131, the light is rotated at an angle of 45°. Then, the light passes through the retardation layer 161 QWP having the same optical axis, and the light reaches the reflecting plate 160. After that, the light reflected on the reflecting plate 160 passes through the retardation layer 161 QWP, and the light is rotated at an angle of 45° by the liquid crystal layer. Thus, the light is emitted in the same direction as the transmission axis of the upper polarizing sheet 151 (upper POL), and then the light passes through the upper polarizing sheet 151. Accordingly, it is displayed as a white level.

As illustrated in FIG. 10, in the transmitting part T, the transmission axis of the upper polarizing sheet 151 (upper POL) is substantially perpendicular to the transmission axis of the lower polarizing sheet 150 (lower POL), whereby the initial alignment direction of liquid crystal is same as the transmission axis of the upper polarizing sheet 151 (upper POL). I.e., it has the same arrangement as the reflective part R except that there is no retardation layer.

On applying the voltage, the liquid crystal molecules of the transmitting part T are rotated at an angle of 45° in relation to the polarizing axis of the upper polarizing sheet.

The path of light emitted from the backlight, in the transmitting part T, will be explained with reference to FIG. 11.

If the liquid crystal is not driven (off-state), the light incident on the lower polarizing sheet 150 (lower POL) from the backlight passes through the liquid crystal layer 131, whereby the light is emitted at an angle of 90° in relation to the transmission axis of the upper polarizing sheet 151 (upper POL). Thus, it is displayed as a black level since the light does not pass through the upper polarizing sheet 151.

In the transmitting part, when driving the liquid crystal (on-state), the light emitted from the backlight (not shown) has a changed polarizing direction. Thus, the light is emitted in the same direction as the transmission axis of the upper polarizing sheet 151 (upper POL), thereby realizing a white level.

At this time, the cell gap of liquid crystal in the transmitting part corresponds to 'd(=2 Δnd)'. It has a phase difference corresponding to $\lambda/2$ (Half Wave Plate; HWP), whereby the polarizing direction of light is changed in symmetrically. If the liquid crystal molecules are rotated at an angle of 45°, the direction of light is changed at an angle of 90° as it passes through the liquid crystal layer 131.

When applying the trans-reflective mode to the IPS mode LCD device, the retardation layer 161 is formed in the reflecting part R. Thus, in the transmitting mode, it is possible to prevent the luminance from being increased in the black level.

The reflective and transmitting parts have the same cell gap, whereby it is possible to realize the simplified process.

In the meantime, the color filter array substrate 121 includes black matrix layer patterns 122, color filter layer patterns 123, and the second alignment layer 191. In this case, the black matrix layer patterns 122 are formed correspond with the margin of the unit pixel regions and the thin film transistors, so as to prevent the light leakage. Also, each of the R, G and B color filter layer patterns 123 is formed between each of the black matrix layer patterns 122. The second alignment layer 191 is formed on an entire surface of the color filter array substrate 121 including the color filter layer patterns 123.

As mentioned above, the IPS mode LCD device according to the present invention has the following advantages.

When applying the trans-reflective mode to the IPS mode LCD device, the retardation layer is formed in the reflecting part. Thus, in the transmitting mode, it is possible to prevent the luminance from being increased in the black level. As a result, the trans-reflective mode can be realized in state of maintaining the high contrast ratio.

The reflective and transmitting parts have the same cell gap, thereby realizing the simplified process and decreasing the errors on fabrication.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. An In-Plane Switching (IPS) mode LCD device, comprising:
   gate and data lines, substantially perpendicular to each other on a first substrate defining at least one unit pixel region having a transmitting part and a reflective part;
   a thin film transistor near a crossing of the gate and data lines;
   a reflective plate in the reflective part;
   a passivation layer on surface of the first substrate including the reflective plate;
   a common line substantially parallel to the gate line;
   a common electrode extending from the common line;
   a pixel electrode, substantially parallel to the common electrode;
   a retardation layer in the reflective part on the pixel electrode;
   a second substrate opposite to the first substrate;
   a liquid crystal layer between the first and second substrates; and
   first and second polarizing sheets on outer surfaces of the first and second substrates respectively, wherein a cell gap in the reflective part is substantially the same as a cell gap in the transmitting part,
   wherein an interval between the common and pixel electrodes in the reflective part is greater than an interval between the common and pixel electrodes in the transmitting part.

2. The IPS mode LCD device of claim 1, wherein the reflective plate is formed in the same layer as the data line.

3. The IPS mode LCD device of claim 1, wherein the common line and the common electrode are formed in the same layer as the gate line or the pixel electrode.

4. The IPS mode LCD device of claim 1, further comprising first and second alignment layers on inner surfaces of the first and second substrates respectively.

5. The IPS mode LCD device of claim 1, wherein the retardation includes RM (Reactive Mesogen).

6. The IPS mode LCD device of claim 1, wherein the retardation layer has the phase delay of about $\lambda/4$.

7. The IPS mode LCD device of claim 1, wherein the retardation layer is formed by a deposition method or a coating method.

8. The IPS mode LCD device of claim 1, further comprising a third alignment layer under the retardation layer.

9. The IPS mode LCD device of claim 1, wherein the transmitting part or the reflective part is formed with a block defined by the common electrode and the pixel electrode.

10. The IPS mode LCD device of claim 1, wherein the interval between the common and pixel electrodes is controlled to rotate liquid crystal molecules of the reflective part at an angle of about 22.5°, and to rotate liquid crystal molecules of the transmitting part at an angle of about 45°.

11. The IPS mode LCD device of claim 1, wherein the cell gap is in a range for obtaining the phase delay of about $\lambda/2$.

12. The IPS mode LCD device of claim 1, wherein polarizing axes of the first and second polarizing sheets are substantially perpendicular to each other, the liquid crystal molecules of liquid crystal layer are initially aligned in the same direction as a transmission axis of the second polarizing sheet, and an optical axis of the retardation layer is rotated at an angle of about 45° in relation to the transmission axis of the second polarizing sheet.

13. An In-Plane Switching IPS mode LCD device, comprising:
   gate and data lines substantially perpendicular to each other on a substrate defining at least one unit pixel region having a transmitting part and a reflective part;
   a thin film transistor near a crossing of the gate and data lines;
   a reflective plate in the reflective part;
   a passivation layer on surface of the first substrate including the reflective plate;
   a common line substantially parallel to the gate line;
   a common electrode extending from the common line;
   a pixel electrode substantially parallel to the common electrode; and
   a retardation layer in the reflective part on the pixel electrode, wherein a cell gap in the reflective part is substantially the same as a cell gap in the transmitting part,
   wherein an interval between the common and pixel electrodes in the reflective part is greater than an interval between the common and pixel electrodes in the transmitting part.

* * * * *